United States Patent
Chong et al.

(10) Patent No.: US 10,051,289 B2
(45) Date of Patent: Aug. 14, 2018

(54) ADAPTIVE CENTER BAND OFFSET FILTER FOR VIDEO CODING

(71) Applicant: Qualcomm Incorporated, San Diego, CA (US)

(72) Inventors: In Suk Chong, San Diego, CA (US); Sanjeev Kumar, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 591 days.

(21) Appl. No.: 13/646,102

(22) Filed: Oct. 5, 2012

(65) Prior Publication Data

US 2013/0114674 A1 May 9, 2013

Related U.S. Application Data

(60) Provisional application No. 61/556,085, filed on Nov. 4, 2011.

(51) Int. Cl.
| | |
|---|---|
| *H04N 7/12* | (2006.01) |
| *H04N 19/86* | (2014.01) |
| *H04N 19/117* | (2014.01) |
| *H04N 19/82* | (2014.01) |
| H04N 19/61 | (2014.01) |

(52) U.S. Cl.
CPC ........... *H04N 19/86* (2014.11); *H04N 19/117* (2014.11); *H04N 19/82* (2014.11); *H04N 19/61* (2014.11)

(58) Field of Classification Search
CPC ...... H04N 19/117; H04N 19/82; H04N 19/86; H04N 19/61; H04N 19/70
USPC ............................ 375/240.01, 240.02, 240.03
See application file for complete search history.

(56) References Cited

U.S. PATENT DOCUMENTS

| | | | |
|---|---|---|---|
| 6,678,411 | B1 | 1/2004 | Crill |
| 6,990,637 | B2 | 1/2006 | Anthony et al. |
| 7,668,382 | B2 | 2/2010 | Wu et al. |
| 8,014,619 | B2 | 9/2011 | Baik et al. |
| 8,995,530 | B2 | 3/2015 | Amano et al. |
| 2008/0123972 | A1 | 5/2008 | Sekiguchi et al. |
| 2009/0086814 | A1 | 4/2009 | Leontaris et al. |
| 2011/0116545 | A1 | 5/2011 | Guo et al. |
| 2011/0182355 | A1 | 7/2011 | Kim et al. |

(Continued)

FOREIGN PATENT DOCUMENTS

| | | |
|---|---|---|
| CN | 101790092 A | 7/2010 |
| CN | 102037732 A | 4/2011 |

(Continued)

OTHER PUBLICATIONS

Wiegand et al.," WD1: Working Draft 1 of High-Efficiency Video Coding", Joint Collaborative Team on Video Coding, JCTVC-C403, Oct. 7-15, 2010, 137 pp.

(Continued)

*Primary Examiner* — Mohammed Rahaman
*Assistant Examiner* — Richard Carter
(74) *Attorney, Agent, or Firm* — Shumaker & Sieffert, P.A.

(57) ABSTRACT

A video coder configured to perform sample adaptive offset filtering can determine a center value for a set of pixels based on values of pixels in the set, divide bands of pixels values into groups based on the center value, and determine offset values for the bands based on the groups.

37 Claims, 6 Drawing Sheets

(56) References Cited

U.S. PATENT DOCUMENTS

| | | | |
|---|---|---|---|
| 2011/0243248 A1 | 10/2011 | Alshin et al. | |
| 2012/0082244 A1 | 4/2012 | Chen et al. | |
| 2012/0177103 A1* | 7/2012 | Fu | H04N 19/82 375/240.02 |
| 2012/0177107 A1* | 7/2012 | Fu et al. | 375/240.03 |
| 2013/0051455 A1* | 2/2013 | Sze | H04N 19/70 375/240.02 |
| 2013/0094568 A1* | 4/2013 | Hsu | H04N 19/82 375/240.02 |
| 2014/0328413 A1* | 11/2014 | Esenlik | H04N 19/197 375/240.29 |

FOREIGN PATENT DOCUMENTS

| | | |
|---|---|---|
| CN | 102137263 A | 7/2011 |
| CN | 102349299 A | 2/2012 |
| KR | 20110111852 A | 10/2011 |
| KR | 101622860 B1 | 5/2016 |
| RU | 2238586 C2 | 10/2004 |
| RU | 2369897 C2 | 10/2009 |
| WO | 0173681 A1 | 10/2001 |
| WO | 2005081505 A1 | 9/2005 |
| WO | 2006027228 A1 | 3/2006 |

OTHER PUBLICATIONS

Bross et al., "High efficiency video coding (HEVC) text specification draft 6," Joint Collaborative Team on Video Coding, JCTVC-H1003, Nov. 21-30, 2011, 259 pp.

Bross et al., "High efficiency video coding (HEVC) text specification draft 7," Joint Collaborative Team on Video Coding, JCTVC-I1003_D2, Apr. 27-May 7, 2012, 290 pp.

Bross et al., "High efficiency video coding (HEVC) text specification draft 8," Joint Collaborative Team on Video Coding, JCTVC-J1003_D7, Jul. 11-20, 2012, 261 pp.

Bross et al., "WD4: Working Draft 4 of High-Efficiency Video Coding," Joint Collaborative Team on Video Coding, JCTVC-F803_d2, Jul. 14-22, 2011, 226 pp.

Bross et al., "WD5: Working Draft 5 of High-Efficiency Video Coding," Joint Collaborative Team on Video Coding, JCTVC-G1103_d2, Nov. 21-30, 2011, 214 pp.

Fu et al., "Sample Adaptive Offset for HEVC," IEEE 13th International Workshop on Multimedia Signal Processing, Oct. 2011, 5 pp.

International Telecommunication Union, "Advanced video coding for generic audiovisual services," Standardization Sector of ITU, Jun. 2011, 674 pp.

Wiegand et al., "WD3: Working Draft 3 of High-Efficiency Video Coding," Joint Collaborative Team on Video Coding, JCTVC-E603, Mar. 16-23, 2011, 193 pp.

Wiegand et al., "WD2: Working Draft 2 of High-Efficiency Video Coding", Joint Collaborative Team on Video Coding, JCTVC-D503, Jan. 20-28, 2011, 153 pp.

Bross, et al., "High efficiency video coding (HEVC) text specification draft 6," JCTVC-H1003, Joint Collaborative Team on Video Coding (JCT-VC) of ITU-T SG16 WP3 and ISO/IEC JTC1/SC29/WG11, 8th Meeting: San José, CA, USA, Feb. 1-10, 2012, 259 pp.

Chen, et al., " CE8 Subtest2: A Joint Proposal on Improving the Adaptive Loop Filter in TMuC0.9 by MediaTek, Qualcomm, and Toshiba", JCT-VC Meeting; MPEG Meeting; Jan. 20, 2011—Jan. 28, 2011; DAEGU; (Joint Collaborative Team on Video Coding of ISO/IECJTC1/SC29/WG11 and ITU-TSG.16); URL: http://WFTP3.ITU.INT/AV-ARCH/JCTVC-SITE/, No. JCTVC-D119, ISSN: 0000-0015, 18 pp.

Fu, et al., "CE8 Subset3: Picture Quadtree Adaptive Offset", Joint Collaborative Team on Video Coding (JCT-VC) of ITU-T SG16 WP3 and ISO/IEC JTC1/SC29/WG11, 4th Meeting: Daegu, KR, Jan. 20-28, 2011, Document JCTVC-D122, 10 pp.

International Search Report and Written Opinion—PCT/US2012/063273—ISA/EPO—Mar. 14, 2013, 14 pp.

Laroche, et al., "On additional SAO Band Offset classifications", JCT-VC Meeting; MPEG Meeting; Nov. 21, 2011—Nov. 30, 2011; Geneva; (Joint Collaborative Team on Video Coding of ISO/IEC JTC1/SC29/WG11 and ITU-T SG.16 ); URL: http://WFTP3.ITU.INT/AV-ARCH/JCTVC-SITE/, No. JCTVC-G246, XP030110230, 7 pp.

Maani, et al., "Flexible Band Offset Mode in SAO" JCT-VC Meeting; MPEG Meeting; Jan. 2, 2012—Oct. 2, 2012; San Jose; (Joint Collaborative Team on Video Coding of ISO/IEC JTC1/SC29/WG11 and ITU-T SG.16 ); URL: http://WFTP3.ITU.INT/AV-ARCH/JCTVC-SITE/, No. JCTVC-H0406, XP030111433, 4 pp.

International Preliminary Report on Patentability—PCT/US2012/063273, The International Bureau of WIPO—Geneva, Switzerland, Apr. 14, 2014, 19 pp.

International Preliminary Report on Patentability—PCT/US2012/063273, The International Bureau of WIPO—Geneva, Switzerland, May 26, 2014, 9 pp.

Bross et al., "High efficiency video coding (HEVC) text specification draft 9," 11th Meeting: Shanghai, CN, Oct. 10-19, 2012, JCTVC-K1003_v7, 290 pp.

Bross et al., "High efficiency video coding (HEVC) text specification draft 10 (for FDIS & Last Call)," 12th Meeting: Geneva, CH, Jan. 14-23, 2013, JCTVC-L1003_v34, 310 pp.

Itu-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.

Fu, et al., "CE13: Sample Adaptive Offset with LCU-Independent Decoding", Joint Collaborative Team on Video Coding (JCT-VC) of ITU-T SG16 WP3 and ISO/IEC JTC1/SC29/WG11 5th Meeting: Geneva, CH, Mar. 16-23, 2011, U.S., JCTVC, XP030008555, JCTVC-E049, URL, http://phenix.it-sudparis.eu/jct/index.php, 6 pp.

Fu, et al., "Sample Adaptive Offset with LCU-based Syntax", JCT-VC Meeting; MPEG Meeting; Jul. 14-22, 2011;.Torino; (Joint Collaborative Team on Video Coding of ISO/IEC JTC1/SC29/WG11 and ITU-T SG.16); URL: http://WFTP3.ITU.INT/AV-ARCH/JCTVC-SITE/, No. JCTVC-F056, XP030009079, 6 pp.

* cited by examiner

SAO_EO_0

SAO_EO_1

SAO_EO_2

SAO_EO_3

ADAPTIVE CENTER BAND OFFSET FILTER FOR VIDEO CODING

This application claims priority to U.S. Provisional Application No. 61/556,085, filed 4 Nov. 2011, the entire contents of which are hereby incorporated by reference.

TECHNICAL FIELD

This disclosure generally relates to video coding and more particularly relates to sample adaptive offset (SAO) filtering in a video coding process.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

This disclosure generally describes techniques related to sample adaptive offset (SAO) filtering and more particularly describes techniques for signaling, in an encoded bitstream, the coefficients used for band-based SAO filtering. This disclosure describes techniques for adaptively determining groupings of bands based on a center value and using the determined groupings for signaling offset values for the bands.

In one example, a method for coding video data includes determining a center value for a set of pixels, wherein the center value is based on values of the pixels; dividing bands of pixels values into groups based on the center value; and, determining offset values for the bands based on the groups.

In another example, a video coding device includes a video coder configured to determine a center value for a set of pixels, wherein the center value is based on values of the pixels; divide bands of pixels values into groups based on the center value; and, determine offset values for the bands based on the groups.

In another example, a computer-readable storage medium stores instructions that cause one or more processors to determine a center value for a set of pixels, wherein the center value is based on values of the pixels; divide bands of pixels values into groups based on the center value; and, determine offset values for the bands based on the groups.

In another example, an apparatus for coding video data includes means for determining a center value for a set of pixels, wherein the center value is based on values of the pixels; means for dividing bands of pixels values into groups based on the center value; and, means for determining offset values for the bands based on the groups.

BRIEF DESCRIPTION OF DRAWINGS

FIG. 2 is an illustration showing examples of edge offset classifications for edge-based sample adaptive offset filtering.

DETAILED DESCRIPTION

Figure 1:
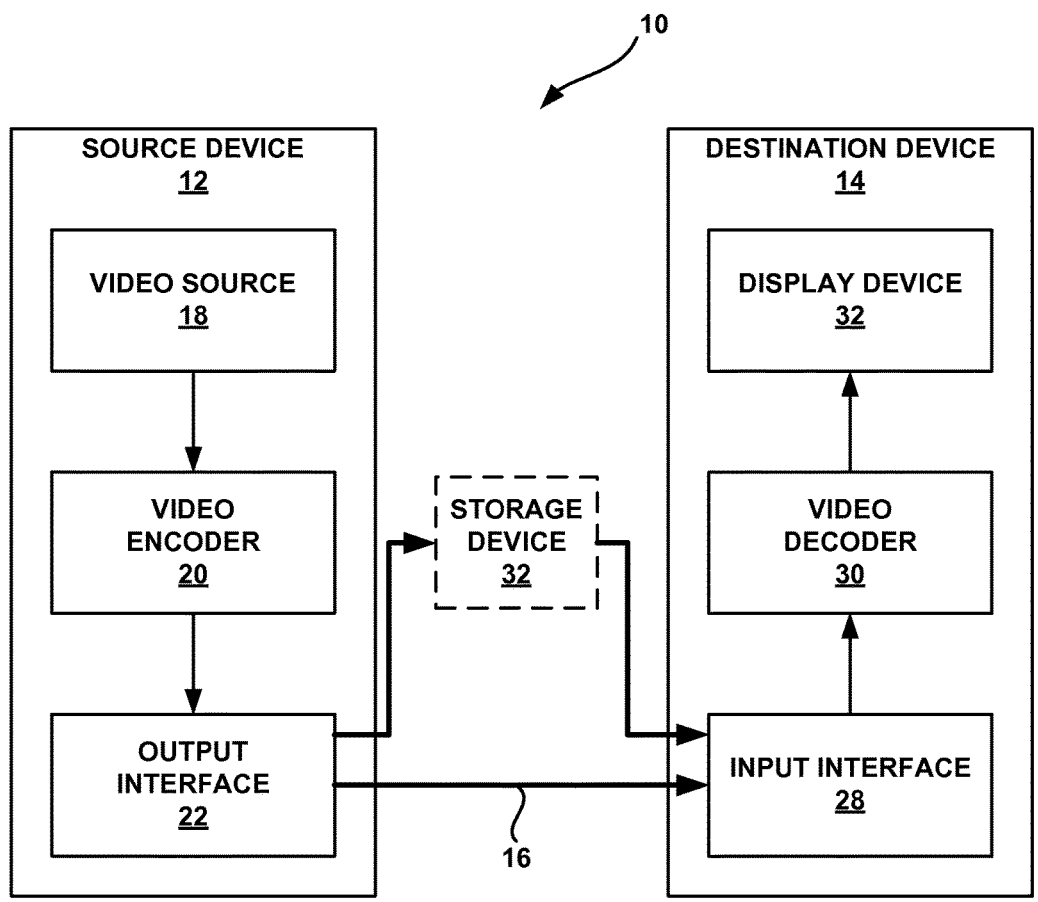
FIG. 1 is a block diagram illustrating an example video encoding and decoding system that may utilize the sample adaptive offset filtering techniques described in this disclosure.

Sample adaptive offset (SAO) filtering is a type of loop filtering used in video coding. In general, the addition of offset values to pixels in a video frame (e.g., a reconstructed image) may in some instances improve coding without greatly increasing the bit overhead needed to store or transmit encoded video data. The improvement in coding that potentially results from SAO filtering may be, for example, that a decoded image more closely resembles an original image. As will be explained in greater detail below, SAO techniques allow for different offset values to be applied to different pixels (or blocks of pixels) depending on pixel (or block) classification metrics, such as edge metrics, band metrics, or other types of metrics.

As will be explained in greater detail below, in some configurations, an SAO filter unit may be configured to perform two types of offset filtering, generally referred to in this disclosure as band offset filtering and edge offset filtering. An SAO filter unit may also at times apply no offset, which can itself be considered a third type of offset filtering. The type of offset filtering applied by an SAO filter may be either explicitly or implicitly signaled to a video decoder. When applying edge offset filtering, pixels can be classified based on edge information of a coding unit, and an offset can be determined for pixels based on the edge classification. As will be explained in greater detail below with reference to FIG. 2, there are typically four variations of edge-based SAO, where the value of a pixel is compared to two of its eight neighboring pixels. Which two pixels are used for comparison depends on which variation of edge-based offset is used. Based on the magnitude difference, an offset is added to the pixel value.

When applying band offset filtering, pixels can be classified into different bands based on a pixel value, such as an intensity value, with each band having an associated offset. A band includes a range of pixel values. For example, pixel values ranging from 0 to 255 may be divided into 32 equal bands (labeled 0 to 31), such that pixel values 0-7 are a first band, pixel values 8-15 are a second band, pixel values 16-23 are a third band, and so on for all thirty-two bands. The bands can be used for determining which particular offset value to apply to a pixel or group of pixels. For example, if a pixel has a value of 10 (which is within the second band, i.e. values 8-15, in the example above), then an offset associated with the second band can be added to the pixel value.

For purposes of signaling and generating the offsets for the various bands, the bands may be grouped into two or more groups. For band offset filtering, pixels may, for example, be categorized into thirty-two bands (bands 0-31) as described above, and the bands may be grouped into two groups (e.g., two groups of sixteen bands, one group of four bands and one group of twenty-eight bands, one group of eight bands and one group of twenty-four bands, or other such groupings). The groupings of bands can be used for determining the order in which the offset values for the bands are signaled in the encoded video bitstream, and/or can be used to determine if a particular band has an offset value other than zero. Offsets for the bands may be signaled using differential coding techniques in which a current value is signaled as a difference between the current value and a previous value. The amount of bit savings achieved by using such coding techniques may in some instances be dependent on the ordering in which the values are signaled. For example, a greater bit savings may be achieved in instances where offset values that are close in value are signaled consecutively. In some instances, all the offset values for a particular group, such as the second group, may be assumed to be zero.

According to some techniques, the groupings of bands are static. For example, according to one technique, the middle sixteen bands (bands 8-23) always constitute one group of sixteen bands while the left-most eight bands (bands 0-7) and the right-most eight bands (bands 24-31) constitute a second group of sixteen bands. This disclosure describes techniques for dynamically determining groupings of bands. As will be explained in greater detail below, a video encoder or video decoder can dynamically determine a grouping of bands by dynamically determining a center value based on pixel values. In some configurations, an indication of a center value can be signaled in the encoded video bitstream such that a video decoder does not need to determine the center value based on pixel values, but instead can determine the center value based on explicit signaling in the bitstream. The center value can be used to determine a first group of bands, and the remaining bands can constitute a second group of bands. As will be made clear in the examples below, the term center value as used in this disclosure generally refers to any value that can be used to align or to approximately align the center of a group of bands to a particular pixel value. Thus, a center value as used in this disclosure may be the particular pixel value upon which the center of the group of bands is aligned or may be some other value, such as a starting pixel value or ending pixel value for a band or group of bands. In some instances, rather than identifying a pixel value, a center value may identify a particular band as the first band of a group, last band of a group, or some other such identification upon which the center of a group of bands can be aligned to a particular pixel value.

The dynamic determining of groupings of bands may, in some instances, improve the signaling of offset coefficients for SAO filtering and, thus, may improve overall video coding quality. This dynamic determining of groupings of bands may also be used to determine for which groups of bands SAO filtering will most benefit video coding quality, with other bands being assumed to have an offset value of zero.

FIG. 1 is a block diagram illustrating an example video encoding and decoding system 10 that may utilize the adaptive SAO techniques described in this disclosure. As shown in FIG. 1, system 10 includes a source device 12 that generates encoded video data to be decoded at a later time by a destination device 14. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via a link 16. Link 16 may comprise any type of medium or device capable of moving the encoded video data from source device 12 to destination device 14. In one example, link 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

Alternatively, encoded data may be output from output interface 22 to a storage device 32. Similarly, encoded data may be accessed from storage device 32 by input interface. Storage device 32 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 32 may correspond to a file server or another intermediate storage device that may hold the encoded video generated by source device 12. Destination device 14 may access stored video data from storage device 32 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 32 may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes a video source 18, video encoder 20 and an output interface 22. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications.

The captured, pre-captured, or computer-generated video may be encoded by video encoder 20. The encoded video data may be transmitted directly to destination device 14 via output interface 22 of source device 12. The encoded video data may also (or alternatively) be stored onto storage device 32 for later access by destination device 14 or other devices, for decoding and/or playback.

Destination device 14 includes an input interface 28, a video decoder 30, and a display device 32. In some cases, input interface 28 may include a receiver and/or a modem. Input interface 28 of destination device 14 receives the encoded video data over link 16. The encoded video data communicated over link 16, or provided on storage device 32, may include a variety of syntax elements generated by video encoder 20 for use by a video decoder, such as video decoder 30, in decoding the video data. Such syntax elements may be included with the encoded video data transmitted on a communication medium, stored on a storage medium, or stored a file server.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

Video encoder 20 and video decoder 30 may operate according to a video compression standard, such as the High Efficiency Video Coding (HEVC) standard presently under development, and may conform to the HEVC Test Model (HM). A recent draft of the HEVC standard, referred to as "HEVC Working Draft 8" or "WD8," is described in document JCTVC-H1003, Bross et al., "High efficiency video coding (HEVC) text specification draft 8," Joint Collaborative Team on Video Coding (JCT-VC) of ITU-T SG16 WP3 and ISO/IEC JTC1/SC29/WG11, 10th Meeting: Stockholm, SE, Jul. 11-20, 2012, which, as of 2 Oct. 2012, is downloadable from the following link: http://phenix.int-evey.fr/jct/doc_end_user/documents/10_Stockholm/wg11/JCTVC-J1003-v8.zip.

Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video compression standards include MPEG-2 and ITU-T H.263.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

The JCT-VC is working on development of the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the working model of the HM describes that a video frame or picture may be divided into a sequence of treeblocks or largest coding units (LCU) that include both luma and chroma samples. A treeblock has a similar purpose as a macroblock of the H.264 standard. A slice includes a number of consecutive treeblocks in coding order. A video frame or picture may be partitioned into one or more slices. Each treeblock may be split into coding units (CUs) according to a quadtree. For example, a treeblock, as a root node of the quadtree, may be split into four child nodes, and each child node may in turn be a parent node and be split into another four child nodes. A final, unsplit child node, as a leaf node of the quadtree, comprises a coding node, i.e., a coded video block. Syntax data associated with a coded bitstream may define a maximum number of times a treeblock may be split, and may also define a minimum size of the coding nodes.

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

In general, a PU includes data related to the prediction process. For example, when the PU is intra-mode encoded, the PU may include data describing an intra-prediction mode for the PU. As another example, when the PU is inter-mode encoded, the PU may include data defining a motion vector for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

In general, a TU is used for the transform and quantization processes. A given CU having one or more PUs may also include one or more transform units (TUs). Following prediction, video encoder 20 may calculate residual values corresponding to the PU. The residual values comprise pixel difference values that may be transformed into transform coefficients, quantized, and scanned using the TUs to produce serialized transform coefficients for entropy coding.

This disclosure typically uses the term "video block" to refer to a coding node of a CU. In some specific cases, this disclosure may also use the term "video block" to refer to a treeblock, i.e., LCU, or a CU, which includes a coding node and PUs and TUs.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context adaptive variable length coding (CAVLC), context adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

In general, the addition of offset values to pixels in a video frame may improve coding in some instances. For example, offset values may be applied to pixels of a reconstructed video block in order to compensate for illumination changes, quantization errors, or more generally, to make decoded video data more closely resemble original video data. SAO techniques allow for different offset values to be applied to different pixels (or blocks of pixels) depending on the pixel values of a pixel (or block). The offset value to be applied to a pixel can be determined based on the value of a pixel. For example, if a pixel has a value that is within a first band, then an offset associated with the first band can be applied to the pixel. If the pixel has a value that is within a second band, then an offset associated with the second band can be applied to the pixel, and so on for all bands.

In one type of SAO implementation, each partition (which consists of a set of LCUs) can have one of three offset types (also called pixel classifications). The three offset types are no offset, band classification based offset type 0/1, and edge classification based type 0/1/2/3. Each band classification offset type has 16 possible offset values, while each edge classification based type has 4 possible offset values. If one of these offset types is chosen to be used for the partition, information indicating the corresponding offset type and the offset values can be signaled in the encoded video bitstream.

Figure 2:
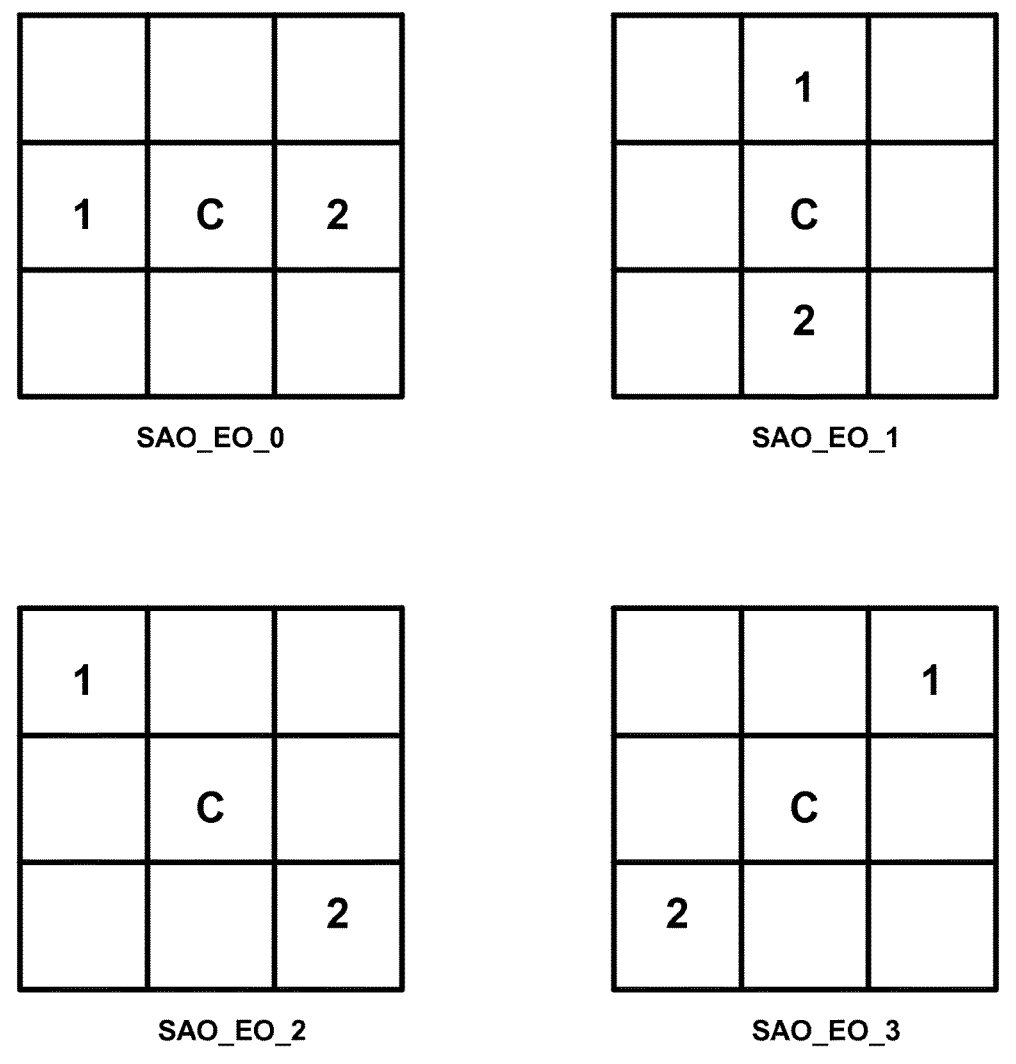

FIG. 2 is a conceptual diagram showing the four possible edge offset classifications used in one implementation of SAO filtering. In the example of FIG. 2, the edge offset type classifies each pixel based on edge information. For each of the edge classifications shown in FIG. 2, an edge type for the current pixel (i.e. a particular pixel being coded) is calculated by comparing the value of the current pixel (C) to the values of neighboring pixels (1 and 2). For SAO edge offset of classification zero (SAO_EO_0), the current pixel is compared to the left and right neighbor pixels. For SAO edge offset of classification one (SAO_EO_1), the current pixel is compared to the top and bottom neighbor pixels. For SAO edge offset of classification two (SAO_EO_2), the current pixel is compared to the upper left and bottom right neighbor pixels. For SAO edge offset of classification three (SAO_EO_3), the current pixel is compared to the bottom left and upper right neighbor pixels.

Initially, the edge type of the current pixel is assumed to be zero. If the value of current pixel C is equal to values of both the left and right neighbor pixels (1 and 2), the edge type remains at zero. If the value of the current pixel C is greater than the value of neighbor pixel 1, the edge type is increased by one. If the value of the current pixel C is less than the value of neighbor pixel 1, the edge type is decreased by one. Likewise, if the value of the current pixel C is less than the value of neighbor pixel 2, the edge type is increased by one, and if the value of the current pixel C is less than the value of the neighbor pixel 2, the edge type is decreased by 1.

As such, the current pixel C may have an edge type of $-2$, $-1$, 0, 1, or 2. The edge type is $-2$ if the value of current pixel C is less than both values of neighbor pixels 1 and 2. The edge type is $-1$ if the value of current pixel C is less than one neighbor pixel, but equal to the other neighbor pixel. The edge type is 0 if the value of current pixel C is the same as both neighbor pixels, or if the value of current pixel C is greater than one neighbor pixel, but less than the other neighbor pixel. The edge type is 1 if the value of the current pixel C is greater than one neighbor pixel, but equal to the other neighbor pixel. The edge type is 2 if the value of the current pixel C is greater than both values of neighbor pixels 1 and 2. For each non-zero edge type value, four offset values are determined and signaled in the encoded video bitstream for use by a decoder (i.e., $eoffset_{-2}$, $eoffset_{-1}$, $eoffset_1$, $eoffset_2$).

In view of the above description, for each edge offset classification, edge type values may be computed with the following pseudocode:

EdgeType=0;

if (C>Pixel 1) EdgeType=EdgeType+1;

if (C<Pixel 1) EdgeType=EdgeType-1;

if (C>Pixel 2) EdgeType=EdgeType+1;

if (C<Pixel 2) EdgeType=EdgeType-1

Figure 3A:
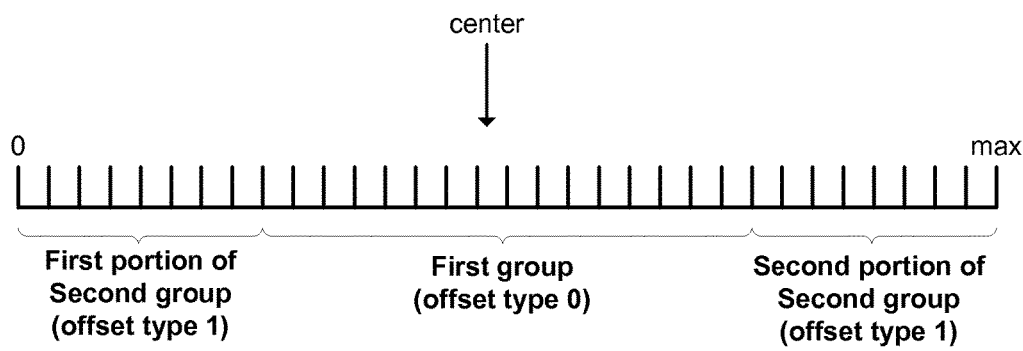
FIGS. 3A and 3B are illustrations showing example grouping of bands for band offset classifications for band-based sample adaptive offset filtering.

FIG. 3A is a conceptual diagram showing example bands based on intensity values. For purposes of example, assume pixel values range from 0-255, although other ranges may also be used. In such an example the max value shown in FIG. 3A would be equal to 255, and each of the thirty-two bands shown in FIG. 3A would have a range of 8. The left-most band would be pixel values 0-7, the next band would be for pixel values of 8-15, the next band would be for pixel values 16-23, and so on, until the right most band which would be for pixel values 248-255. For band offset, pixels are classified into different bands based on intensity (i.e., for band offset classification, pixels are categorized into one of the thirty-two bands). Based on which band a pixel value falls in, an offset is added to the pixel. For example, if a pixel has a value of 19, then the pixel value falls within the third band which ranges from pixel value 16 to 23. Thus, an offset associated with the third band would be added to the pixel value of 19.

For purposes of signaling the offset values associated with each bands, the bands can be grouped into two or more groups. In some implementations, the sixteen bands in the center (bands 8-23) are classified into one group and the remaining bands (bands 0-7 and 24-31) are classified into a second group. For each group of bands, 16 offset values (i.e., boffset$_0$, . . . , boffset$_{15}$) are determined and are signaled in the encoded video bitstream for use by a video decoder. In some implementations, all the offset values for a group, such as the second group, may be assumed to be 0, in which case no signaling of offset values for that group needs to be included in the encoded video bitstream.

As shown in FIG. 3A, the middle sixteen bands (bands 8-23) constitute the first group of bands, while the eight left-most bands (band 0-7) constitute the first portion of a second group of bands, and the eight right-most bands (bands 24-31) constitute a second portion of the second group of bands. According to current techniques, this grouping of bands is fixed. This disclosure describes techniques for adaptively determining the groupings of bands. For example, this disclosure describes techniques for determining a center value for a set of pixels based on values of pixels. The center value may, for example, be determined based on a determined center for a group of bands, and the center for the group of bands may be determined based on a mean value for the set of pixels, a median value for set of pixels, or by determining the pixel where the peak of a histogram lies.

The bands of pixel values may be divided into groups based on the center value. For example, the center value may be used to determine a center for one group of bands. Again assuming thirty-two bands (bands 0-31) and two groups, the eight bands to the right of the center and the eight bands to the left of the center may be the first group of bands. The remaining sixteen bands may be the second group. Thus, unlike prior techniques where one group always consisted of the middle sixteen bands, this disclosure describes techniques where the groupings of bands may be adaptive based on a center value that is determined based on the actual pixel values.

Figure 3B:
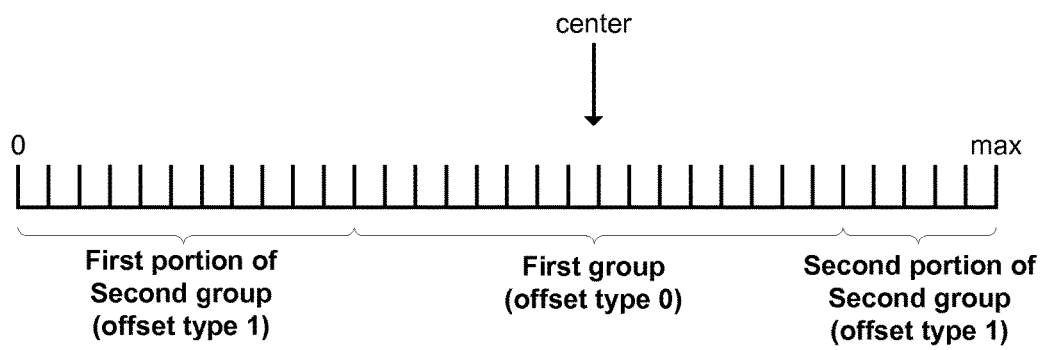

FIG. 3B shows one of many possible groupings that may be used according to the techniques of this disclosure. In the example of FIG. 3B, a center is determined near band 18. Accordingly, the first group of bands includes the eight bands to the left of the center (bands 11-18) and the eight bands to the right of the center (bands 19-26). The second groups of bands includes the remaining bands, which in this example are bands 0-4 and bands 27-31. Again, FIG. 3B represents one of many possible scenarios. The main purpose of FIG. 3B is to show that according to the techniques of this disclosure, the center for determining the first group of bands may be determined adaptively and does not need to be fixed at the location shown in FIG. 3A or fixed at any other location. Techniques for determining a center value and adaptively determining groupings of bands will be explained in greater detail below.

Figure 4:
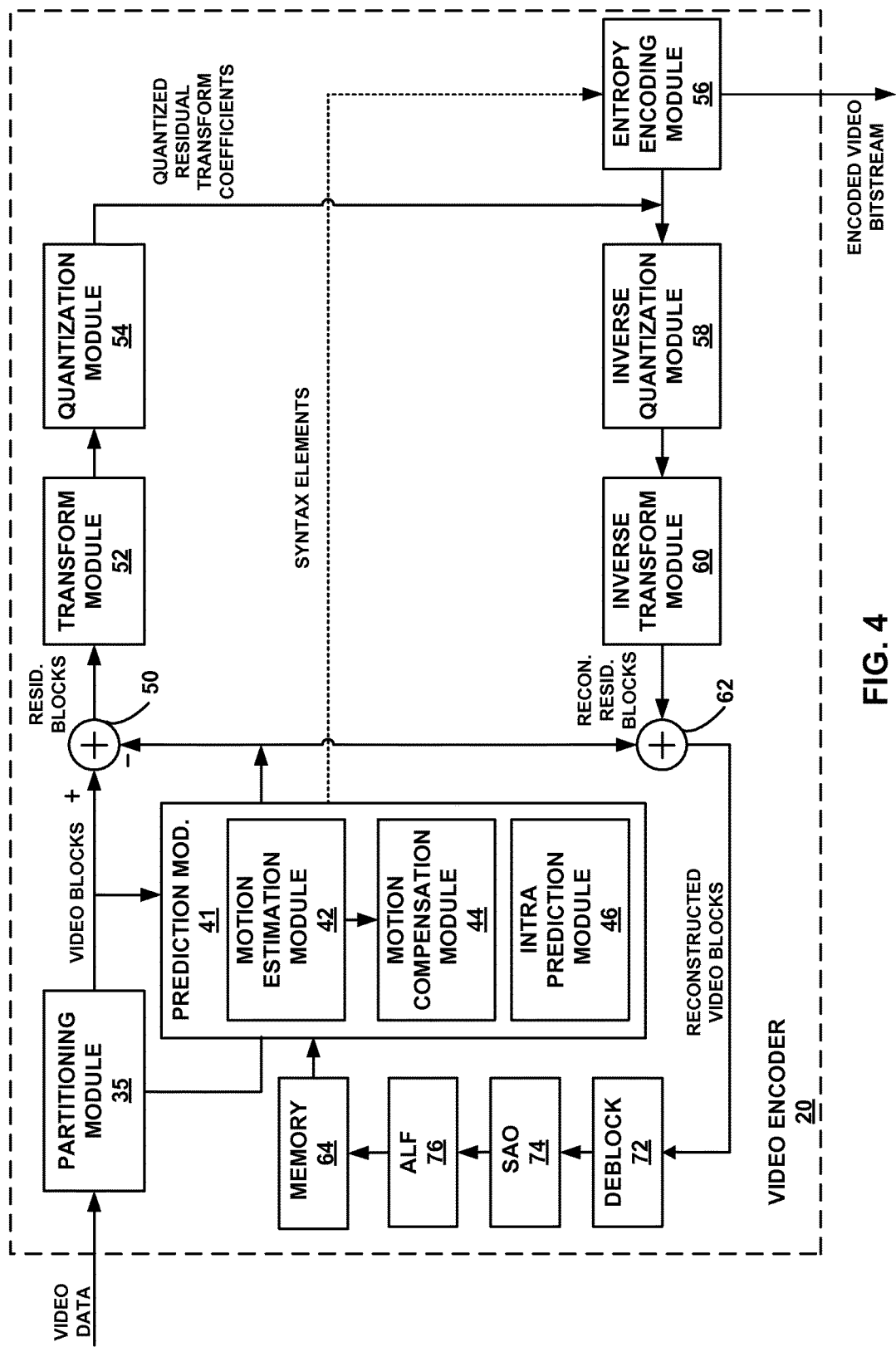
FIG. 4 is a block diagram illustrating an example video encoder that may implement the sample adaptive offset filtering techniques described in this disclosure.

FIG. 4 is a block diagram illustrating an example video encoder 20 that may implement the SAO filtering techniques described in this disclosure. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 4, video encoder 20 includes a partitioning module 35, prediction module 41, reference picture memory 64, summer 50, transform module 52, quantization module 54, and entropy encoding module 56. Prediction module 41 includes motion estimation module 42, motion compensation module 44, and intra prediction module 46. For video block reconstruction, video encoder 20 also includes inverse quantization module 58, inverse transform module 60, and summer 62. Deblocking filter 72 may also be included to filter block boundaries to remove blockiness artifacts from reconstructed video. As shown in FIG. 4, video encoder 20 also includes additional loop filters, including sample adaptive offset (SAO) filter 74 and adaptive loop filter (ALF) 76. Although deblocking filter 72, SAO filter 74, and ALF 76 are shown as being in-loop filters in FIG. 4, in some configurations deblocking filter 72, SAO filter 74, and ALF 76 may be implemented as post-loop filters.

As shown in FIG. 4, video encoder 20 receives video data, and partitioning module 35 partitions the data into video blocks. This partitioning may also include partitioning into slices, tiles, or other larger units, as wells as video block partitioning, e.g., according to a quadtree structure of LCUs and CUs. Video encoder 20 generally illustrates the components that encode video blocks within a video slice to be encoded. The slice may be divided into multiple video blocks (and possibly into sets of video blocks referred to as tiles). Prediction module 41 may select one of a plurality of possible coding modes, such as one of a plurality of intra coding modes or one of a plurality of inter coding modes, for the current video block based on error results (e.g., coding rate and the level of distortion). Prediction module 41 may provide the resulting intra- or inter-coded block to summer 50 to generate residual block data and to summer 62 to reconstruct the encoded block for use as a reference picture.

Intra prediction module 46 within prediction module 41 may perform intra-predictive coding of the current video block relative to one or more neighboring blocks in the same frame or slice as the current block to be coded to provide spatial compression. Motion estimation module 42 and motion compensation module 44 within prediction module 41 perform inter-predictive coding of the current video block relative to one or more predictive blocks in one or more reference pictures to provide temporal compression.

Motion estimation module 42 may be configured to determine the inter-prediction mode for a video slice according to a predetermined pattern for a video sequence. The predetermined pattern may designate video slices in the sequence as predicted slices (P slices), bi-direction predicted slices (B slices), or generalized P/B slices (GPB slices). Motion estimation module 42 and motion compensation module 44 may be highly integrated, but are illustrated separately for conceptual purposes. Motion estimation, performed by motion estimation module 42, is the process of generating motion vectors, which estimate motion for video blocks. A motion vector, for example, may indicate the displacement of a PU of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation module 42 may perform a motion search relative to the full pixel positions and fractional pixel positions and output a motion vector with fractional pixel precision.

Motion estimation module 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation module 42 sends the calculated motion vector to entropy encoding module 56 and motion compensation module 44.

Motion compensation, performed by motion compensation module 44, may involve fetching or generating the predictive block based on the motion vector determined by motion estimation, possibly performing interpolations to sub-pixel precision. Upon receiving the motion vector for the PU of the current video block, motion compensation module 44 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation module 44 may also generate syntax elements associated with the video blocks and the video slice for use by video decoder 30 in decoding the video blocks of the video slice.

Intra-prediction module 46 may perform intra-prediction on a current block, as an alternative to the inter-prediction performed by motion estimation module 42 and motion compensation module 44, as described above. In particular, intra-prediction module 46 may determine an intra-prediction mode to use to encode a current block. In some examples, intra-prediction module 46 may encode a current block using various intra-prediction modes, e.g., during separate encoding passes, and intra-prediction module 46 (or mode select module 40, in some examples) may select an appropriate intra-prediction mode to use from the tested modes. For example, intra-prediction module 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction module 46 may calculate ratios from the distortions and rates for the various encoded blocks to determine which intra-prediction mode exhibits the best rate-distortion value for the block.

In any case, after selecting an intra-prediction mode for a block, intra-prediction module 46 may provide information indicative of the selected intra-prediction mode for the block to entropy encoding module 56. Entropy encoding module 56 may encode the information indicating the selected intra-prediction mode in accordance with the techniques of this disclosure. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

After prediction module 41 generates the predictive block for the current video block via either inter-prediction or intra-prediction, video encoder 20 forms a residual video block by subtracting the predictive block from the current video block. The residual video data in the residual block may be included in one or more TUs and applied to transform module 52. Transform module 52 transforms the residual video data into residual transform coefficients using a transform, such as a discrete cosine transform (DCT) or a conceptually similar transform. Transform module 52 may convert the residual video data from a pixel domain to a transform domain, such as a frequency domain.

Transform module 52 may send the resulting transform coefficients to quantization module 54. Quantization module 54 quantizes the transform coefficients to further reduce bit rate. The quantization process may reduce the bit depth associated with some or all of the coefficients. The degree of quantization may be modified by adjusting a quantization parameter. In some examples, quantization module 54 may then perform a scan of the matrix including the quantized transform coefficients. Alternatively, entropy encoding module 56 may perform the scan.

Following quantization, entropy encoding module 56 entropy encodes the quantized transform coefficients. For example, entropy encoding module 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding module 56, the encoded bitstream may be transmitted to video decoder 30, or archived for later transmission or retrieval by video decoder 30. Entropy encoding module 56 may also entropy encode the motion vectors and the other syntax elements for the current video slice being coded.

Inverse quantization module 58 and inverse transform module 60 apply inverse quantization and inverse transformation, respectively, to reconstruct the residual block in the pixel domain for later use as a reference block of a reference picture. Motion compensation module 44 may calculate a reference block by adding the residual block to a predictive block of one of the reference pictures within one of the reference picture lists. Motion compensation module 44 may also apply one or more interpolation filters to the reconstructed residual block to calculate sub-integer pixel values for use in motion estimation. Summer 62 adds the reconstructed residual block to the motion compensated prediction block produced by motion compensation module 44 to produce a reference block for storage in reference picture memory 64.

Prior to storage in memory 64, the reconstructed residual block can be filtered by one or more filters. If desired, deblocking filter 72 may also be applied to filter the reconstructed residual blocks in order to remove blockiness artifacts. Other loop filters (either in the coding loop or after the coding loop) may also be used to smooth pixel transitions, or otherwise improve the video quality. One example of these other filter is SAO filter 74. The reference block may be used by motion estimation module 42 and motion compensation module 44 as a reference block to inter-predict a block in a subsequent video frame or picture.

SAO filter 74 can determine offset values for SAO filtering in a manner that improves video coding quality. Improving video coding quality may, for example, involve determining offset values that make a reconstructed image more closely match an original image. Video encoder 20 may, for example, code the video data using multiple passes with different offset values and choose, for inclusion in an encoded bitstream, the offset values that offer the best coding quality, as determined based on a rate-distortion calculation.

In some configurations, SAO filter 74 may be configured to apply two types of offset (e.g., band offset and edge offset) as described above. SAO filter 74 may also at times apply no offset, which can itself be considered a third type of offset. The type of offset applied by SAO filter 74 may be either explicitly or implicitly signaled to a video decoder. When applying edge offset, pixels can be classified based on edge information in accordance with FIG. 2 and a filter can be determined based on the edge classification. When applying band offset, SAO filter 74 can classify pixels into different bands based on a pixel value, such as an intensity value, with each band having an associated offset.

For purposes of signaling and generating the offsets for the various bands, SAO filter 74 may group the thirty-two bands into two or more groups, as shown in the examples of FIGS. 3A and 3B. SAO filter 74 may, for example, group each of the thirty-two bands into two groups (i.e. two groups of sixteen bands). Although this disclosure generally describes grouping bands into two groups of equal size, more than two groups and groups of unequal sizes may also be used. This disclosure describes techniques for determining how these groups are determined.

Each band can span a range of pixel values. A pixel value may, for example, be a pixel intensity value and may describe any of an RGB value, a luminance value, a chrominance value, or any other type of pixel value. The techniques described in this disclosure may, for example, be applied to either the chroma samples of video data, the luma samples of video data, or to both the chroma and luma samples of video data.

In some implementations, a first group of bands may be centered at the center of the range of possible pixel values (i.e. max/2). Thus, for example, if the range of pixel values is 0-255, the center of the first group of bands might be between pixel value 127 and pixel value 128, with the first group spanning values 64-191. A first portion of the second group can span pixel values 0-63 and a second portion of second group can span pixel values 192 to 255. The first group includes sixteen bands, and the second group includes sixteen bands (eight bands in the first portion and eight bands in the second portion). This example grouping is shown in FIG. 3A. While the examples of this disclosure generally assume each band of the thirty-two bands is equal in size, in some implementations, bands of unequal size may be used.

According to techniques of this disclosure, SAO filter 74 may adaptively determine the center of the first group instead of using a static grouping of bands. SAO filter 74 may, for example, determine the center of the first group based on a mean or median of pixel values for the pixels in a region of a frame. SAO filter 74 may also determine the center of the first group based on the pixel where a peak of a histogram lies. Once SAO filter 74 determines the center of the first group, SAO filter 74 can then determine the second group. Again, assuming thirty-two bands, the first group can include approximately eight bands to the left of the center and approximately eight bands to the right of the center. The remaining bands can form the second group.

As one example, assume a maximum pixel value is 256, and SAO filter 74 determines a center for a first group of band, based on any of the techniques described above, at pixel value 90. In such a case, relative to the static grouping of FIG. 3A, the first group of bands may shift to the left, making the first portion of the second group smaller while making the second portion of the second group larger. If, however, SAO filter 74 determines a center for the first group of bands at 170, then the first group shifts to the right relative to the static grouping of FIG. 3A, making the first portion of the second group larger and the second portion of the second group smaller. SAO filter 74 can determine the center according to any of the techniques described in this disclosure for determining a mean, median, or peak of a histogram value or may be determined in some other manner.

After determining a center, SAO filter 74 can determine a first group of bands. SAO filter 74 can determine the first group of bands by identifying the eight bands to the left of the center and the eight bands to the right of the center. In some instances, the determined center may fall within a band. Again assuming 32 equal bands (bands 0-31) and pixel values of 0-255, band 12 has a range of values from 96 to 103. If, for example, SAO filter 74 determines a center of 99, then the center falls within the range of pixel values covered by band 12. In such an instance, SAO filter 74 may be configured to always include band 12 as one of the eight bands to the left of the center or always include band 12 as one of the eight bands to the right of the center. If SAO filter 74 identifies band 12 as one of the eight bands to the left of the center, then the first group of bands includes bands 5-20, while the second group includes bands 0-4 and 21-31. If SAO filter 74 identifies band 12 as one of the eight bands to the right of the center, then the first group of bands includes bands 6-21, while the second group includes bands 0-5 and bands 22-31. SAO filter 74 may also be configured to determine whether to include band 12 with the bands to the left of the center or the bands to the right of the center based on where within the band the center falls. As 99 is closer to 96 than to 103, SAO filter 74 may be configured to identify band 12 as one of the bands to the left of the center in response to determining a center of 99. In response to determining a center of 101, however, which is closer to 103 than to 96, SAO filter 74 may be configured to identify band 12 as one of the bands to the right of the center.

Although the techniques of this disclosure have generally been described using examples with thirty-two bands and two groups of sixteen bands, the techniques of this disclosure are generally applicable to SAO schemes that use more or fewer bands and more or fewer groups. As one of many possible examples, the techniques of this disclosure may be used to determine a first group of four bands and a second group of twenty-eight bands, with the offsets for the second group all assumed to have a value of zero. In another example, sixteen bands, sixty-four bands, or some other number of bands may be used.

SAO filter 74 can generate and signal offsets for the bands based on these groupings. For each group of bands (again assuming groups of sixteen bands), sixteen offset values can be determined and signaled in the encoded video bitstream for use by a video decoder. In one example, the number of bits required to send a group of sixteen band offset values may be reduced by taking advantage of correlations between band offset values within the group. In another example, the band offset values of a neighboring partition can be used to predict the band offset values for a group of a current partition. The neighboring partition may be a partition that is causal to the current partition (i.e., the neighboring partition has already been encoded). Examples of neighboring partitions include spatially neighboring partitions such as the partitions above or to the left of the current partition, or temporally neighboring partitions such as partitions in previously encoded frames (e.g., co-located partitions).

The techniques for finding a center can be applied to each LCU or to groups of LCUs. The techniques may, for example, be applied to regions of a frame that are determined in a manner analogous to the quadtree partitioning discussed above. A frame may be partitioned into four regions, each region may be partitioned into four smaller regions, and so on. SAO filter 74 may determine center values as described above based on all pixel values within a group of LCUs or other region of frame or may determine center values by sub-sampling pixels in a manner that utilizes fewer than all of the available pixel values in the LCU or group of LCUs.

Video encoder 20 of FIG. 4 represents an example of a video encoder configured to determine a center value for a set of pixels based on values of the; divide bands of pixels values into groups based on the center value; and, determine offset values for the bands based on the groups. Video encoder 20 can determine a center for a first set of pixels by determining a mean value for the set of pixels, determining a median value for the set of pixels, and/or determining the pixel where the peak of a histogram lies. Video encoder 20 can determine offset values for the bands based on the groups by generating a band offset value for a band of a first group based on a second band offset of the first group. Video encoder 20 can determine offset values for the bands based on the groups by generating a band offset value for a band of a first group based on a band offset determined for a neighboring partition. Video encoder 20 can also signal band offset values to a video decoder based on the groups. In some implementations, video encoder 20 may generate a syntax element for inclusion in an encoded bitstream that indicates the determined center value. In some instances, the syntax element may be an explicit indication of the center determined for a group of bands, but the syntax element does not necessarily need to be an explicit indication of the determined center. For example, the center value can identify the first or last band of a particular group to enable a video decoder to reconstruct the same groupings of bands determined by video encoder 20. In such an instance, the groupings of bands reconstructed by the video decoder can be aligned to the same center as the groupings determined by the video encoder even though the center is not explicitly signaled in the encoded bitstream.

Figure 5:
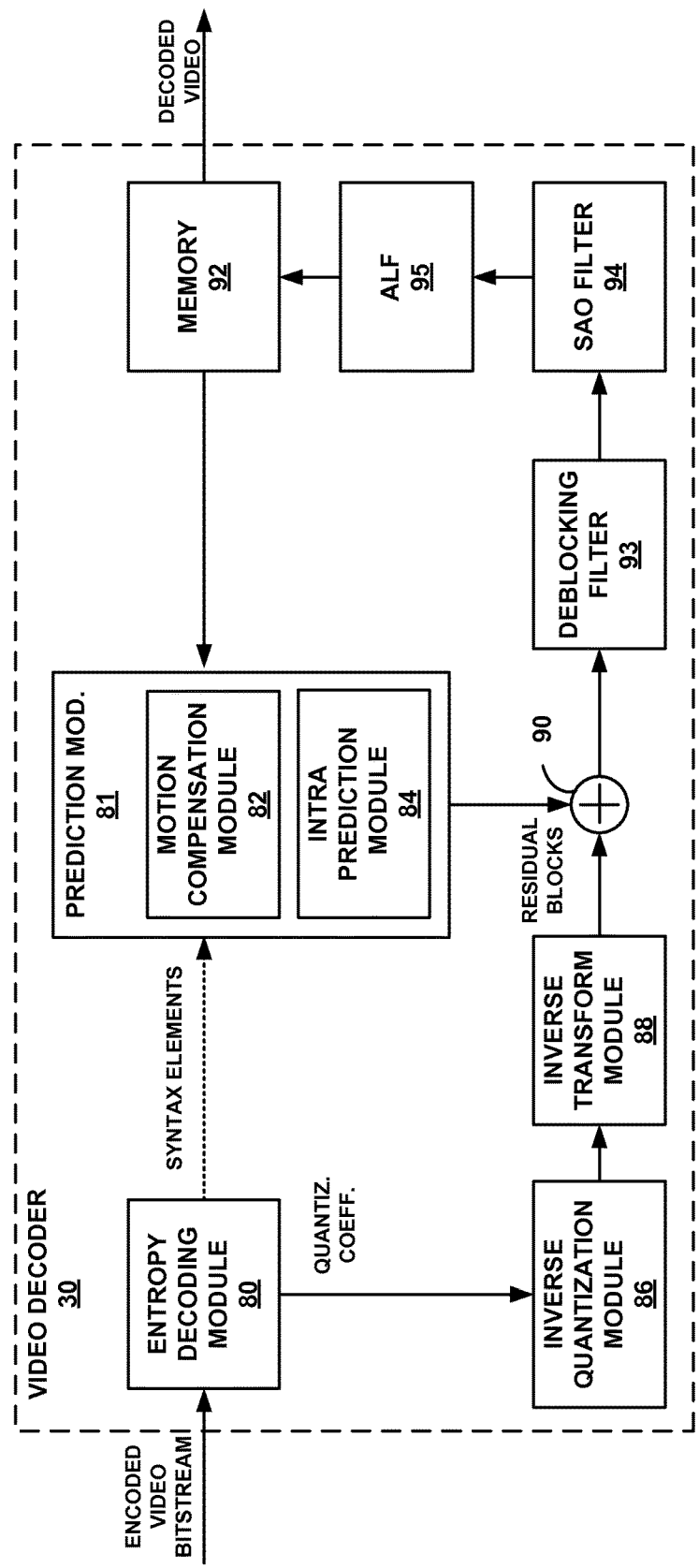
FIG. 5 is a block diagram illustrating an example video decoder that may implement the sample adaptive offset filtering techniques described in this disclosure.

FIG. 5 is a block diagram illustrating an example video decoder 30 that may implement the techniques described in this disclosure. In the example of FIG. 5, video decoder 30 includes an entropy decoding module 80, prediction module 81, inverse quantization module 86, inverse transformation module 88, summer 90, and reference picture memory 92. Prediction module 81 includes motion compensation module 82 and intra prediction module 84. Video decoder 30 may, in some examples, perform a decoding pass generally reciprocal to the encoding pass described with respect to video encoder 20 from FIG. 4.

During the decoding process, video decoder 30 receives an encoded video bitstream that represents video blocks of an encoded video slice and associated syntax elements from video encoder 20. Entropy decoding module 80 of video decoder 30 entropy decodes the bitstream to generate quantized coefficients, motion vectors, and other syntax elements. Entropy decoding module 80 forwards the motion vectors and other syntax elements to prediction module 81. Video decoder 30 may receive the syntax elements at the video slice level and/or the video block level.

When the video slice is coded as an intra-coded (I) slice, intra prediction module 84 of prediction module 81 may generate prediction data for a video block of the current video slice based on a signaled intra prediction mode and data from previously decoded blocks of the current frame or picture. When the video frame is coded as an inter-coded (e.g., B, P or GPB) slice, motion compensation module 82 of prediction module 81 produces predictive blocks for a video block of the current video slice based on the motion vectors and other syntax elements received from entropy decoding module 80. The predictive blocks may be produced from one of the reference pictures within one of the reference picture lists. Video decoder 30 may construct the reference frame lists, List 0 and List 1, using default construction techniques based on reference pictures stored in reference picture memory 92.

Motion compensation module 82 determines prediction information for a video block of the current video slice by parsing the motion vectors and other syntax elements, and uses the prediction information to produce the predictive blocks for the current video block being decoded. For example, motion compensation module 82 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation module 82 may also perform interpolation based on interpolation filters. Motion compensation module 82 may use interpolation filters as used by video encoder 20 during encoding of the video blocks to calculate interpolated values for sub-integer pixels of reference blocks. In this case, motion compensation module 82 may determine the interpolation filters used by video encoder 20 from the received syntax elements and use the interpolation filters to produce predictive blocks.

Inverse quantization module 86 inverse quantizes, i.e., de-quantizes, the quantized transform coefficients provided in the bitstream and decoded by entropy decoding module 80. The inverse quantization process may include use of a quantization parameter calculated by video encoder 20 for each video block in the video slice to determine a degree of quantization and, likewise, a degree of inverse quantization that should be applied. Inverse transform module 88 applies an inverse transform, e.g., an inverse DCT, an inverse integer transform, or a conceptually similar inverse transform process, to the transform coefficients in order to produce residual blocks in the pixel domain.

After motion compensation module 82 generates the predictive block for the current video block based on the motion vectors and other syntax elements, video decoder 30 forms a decoded video block by summing the residual blocks from inverse transform module 88 with the corresponding predictive blocks generated by motion compensation module 82. Summer 90 represents the component or components that perform this summation operation. The decoded video blocks formed by summer 90 can then be filtered by a deblocking filter 93, SAO filter 94, and adaptive loop filter 95. The decoded video blocks in a given frame or picture are then stored in reference picture memory 92, which stores reference pictures used for subsequent motion compensation. Reference picture memory 92 also stores decoded video for later presentation on a display device, such as display device 32 of FIG. 1.

SAO filter 94 can be configured to apply the same filtering (e.g., edge offset and band offset) as SAO filter 74 discussed above. In this manner, as part of performing band offset, SAO filter 74 can determine a center value for a first group of bands as described above in reference to FIG. 4. The center value may, for example, be determined based on a metric such as the mean pixel value, the median pixel value, or determined based on a pixel where the peak of a histogram lies for an LCU or a group of LCUs.

In some implementations, SAO filter 94 may receive in the video bitstream an indication of a center determined at a video encoder. The indication may take the form of an actual center value as calculated by a video encoder or may take the form of an identification of a first band for the first group, an indication of a last band of a first portion of a second group, a middle value for the first group, or some other such piece of information that enables SAO filter 94 to determine the same grouping of bands used by a video encoder. Based on a first group and a second group determined based on the center value, SAO filter 94 can generate offset values based on information received in an encoded video bitstream. For one of the groups, such as the second group, the offset values may be assumed to all be equal to zero.

For a group of LCUs, SAO filter 94 may determine a center value by determining a mean pixel value for the group of LCUs. SAO filter 94 can determine the mean pixel value by summing the pixel values of all or some of the pixels in the group of LCUs and dividing by the number of pixels whose values were part of the sum, with the resulting value being the mean pixel value for the group of LCUs. SAO filter unit 94 may then use the determined mean pixel value in the manner described above to determine groupings of bands.

Alternatively, for a group of LCUs, SAO filter 94 may determine a center value by determining a median pixel value for the group of LCUs. SAO filter 94 can determine the median pixel value by identifying the value at which half the pixel values of the group of LCUs are greater than the value, and half the pixel values for the group of LCUs are lower than the value. SAO filter unit 94 may then use the determined median pixel value in the manner described above to determine groupings of bands.

Alternatively, for a group of LCUs, SAO filter 94 may determine a center value by determining where the peak of a histogram lies for an LCU or a group of LCUs. A histogram generally can be considered to be a statistical representation of the distribution of pixel values for the group of LCUs. Therefore, SAO filter 94 can determine the peak of the histogram by identifying the pixel value or pixel values that appear most frequently in the group of LCUs. SAO filter unit 94 may then use the determined value of the peak in the histogram in the manner described above to determine groupings of bands.

The three examples of how to determine a center value (e.g. mean, median, peak of histogram) may be performed by either or both of SAO filter 74 and SAO filter 94 and are not the only three possible techniques by which a center value may be determined. It is contemplated that the techniques of this disclosure, which generally relate to dynamically determining the groupings of bands for signaling band offset values, may be compatible with other such techniques for determining a center value.

Video decoder 30 of FIG. 5 represents an example of a video decoder configured to determine a center value for a set of pixels based on values of the pixels, divide bands of pixels values into groups based on the center value, and determine offset values for the bands based on the groups. In some implementations, video decoder 30 can determine the center value by receiving a syntax element indicating the center value. As described above, the syntax element may or may not be an explicit indication of the center value. In some implementations, video decoder 30 can determine the center value by determining a mean value for the set of pixels, determining a median value for the set of pixels, and/or determining the pixel where the peak of a histogram lies. Video decoder 30 can determine offset values for the bands based on the groups by generating a band offset value for a band of a first group based on a second band offset of the first group. Video decoder 30 can determine offset values for the bands based on the groups by generating a band offset value for a band of a first group based on a band offset determined for a neighboring partition. Video decoder 30 can also reconstruct band offset values signaled from a video encoder based on the groups.

In this manner, video decoder 30 of FIG. 5 represents an example of a video decoder configured to determine a center value for a set of pixels based on values of pixels for the group; divide bands of pixels values into groups based on the center value; and determine offset values for the bands based on the groups. Video decoder 30 may determine the center value by receiving a syntax element indicating the center value, determine the center value by determining a mean value for the set of pixels, determine the center value by determining a median value for the set of pixels, or by determining the center value comprises determining the pixel where the peak of a histogram lies. The set of pixels may, for example, include a group of largest coding units (LCUs). Video decoder 30 may determine offset values for the bands based on the groups by generating a band offset value for a band of a first group based on a second band offset of the first group. Video decoder 30 may determine offset values for the bands based on the groups by generating a band offset value for a band of a first group based on a band offset determined for a neighboring partition.

Figure 6:
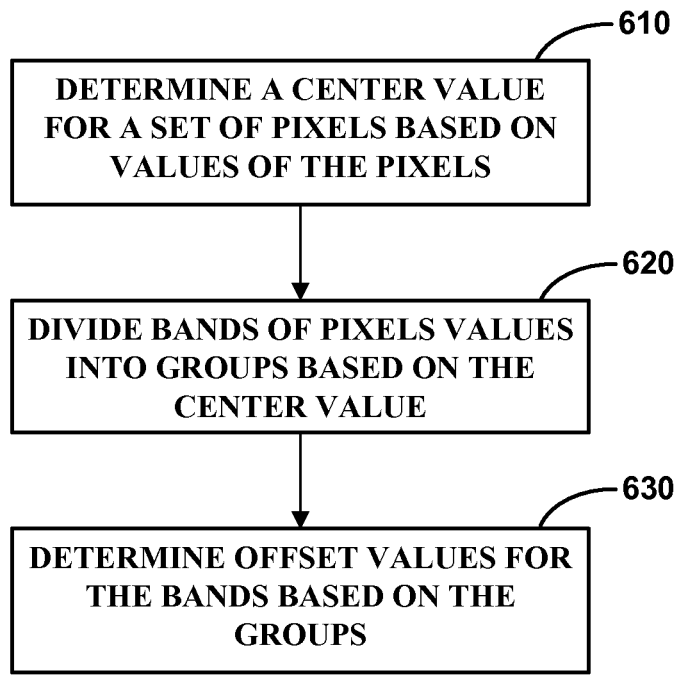
FIG. 6 shows a flow diagram illustrating sample adaptive offset filtering techniques described in this disclosure.

FIG. 6 shows a flow diagram illustrating the SAO filtering techniques described in this disclosure. The techniques of FIG. 6 can be performed by a video coder with an SAO filtering module such as video encoder 20 or video decoder 30. The techniques of FIG. 6 will be described with reference to video decoder 30, although it should be understood that the techniques of FIG. 6 are applicable to a wide array of video coding devices and not limited only to video decoders.

Video decoder 30 determines a center value for a set of pixels based on values of pixels (610). Video decoder 30 may, for example, determine the center value by determining a mean value for the set of pixels, determining a median value for the set of pixels, determining a pixel where the peak of a histogram lies. Video decoder 30 divides bands of pixels values into groups based on the center value (620). Video decoder 30 determines offset values for the bands based on the groups (630). Video decoder 30 may determine offset values for the bands based on the groups by generating a band offset value for a band of a first group based on a second band offset of the first group. Video decoder 30 may also determine offset values for the bands based on the groups by generating a band offset value for a band of a first group based on a band offset determined for a neighboring partition.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for coding video data, the method comprising:
   determining that a sample adaptive offset (SAO) type for a first set of samples comprises a band classification offset type, wherein the video data includes sample values ranging from 0 to a maximum value;
   in response to determining that the SAO type for the first set of samples comprises the band classification offset type, determining a first center value for the first set of samples, wherein the first center value comprises a first value between 0 and the maximum value;
   determining that an SAO type for a second set of samples comprises the band classification offset type;
   in response to determining that the SAO type for the second set of samples comprises the band classification offset type, determining a second center value for the second set of samples, wherein the second center value comprises a second value between 0 and the maximum value, and wherein the first center value is different than the second center value;
   based on the second center value, determining a first group of bands and a second group of bands, wherein the second center value identifies a band included in the first group of bands, and wherein the second group of bands comprises bands not included in the first group of bands, wherein each band of the first and second groups of bands comprises a range of sample values, and wherein each of the first and second groups of bands comprises one or more bands;
   determining first offset values for the first group of bands;
   determining second offset values for the second group of bands;
   based on a sample value of at least one sample of the second set of samples, determining a band from the first or second group of bands; and
   applying, to the at least one sample, an offset value associated with the determined band to generate a filtered image.

2. The method of claim 1, wherein the method is performed by a video decoder, and wherein determining the second center value comprises receiving a syntax element indicating the second center value.

3. The method of claim 1, wherein the method is performed by a video encoder, and wherein the method further comprises:
   generating a syntax element for inclusion in an encoded bitstream, wherein the syntax element indicates the second center value.

4. The method of claim 1, wherein determining the second center value comprises determining a mean value for the second set of samples.

5. The method of claim 1, wherein determining the second center value comprises determining a median value for the second set of samples.

6. The method of claim 1, wherein determining the second center value comprises determining a sample where the peak of a histogram lies.

7. The method of claim 1, wherein the second set of samples comprises a largest coding unit.

8. The method of claim 1, wherein determining the first offset values for the first group of bands comprises generating a band offset value for a first band of the first group based on a band offset for a second band offset of the first group.

9. The method of claim 1, wherein determining the first offset values for the first group of bands comprises generating a band offset value for a band of the first group of bands based on a band offset determined for a neighboring partition.

10. The method of claim 1, wherein determining that the SAO type for the second set of samples comprises the band classification offset type comprises receiving signaling information indicating the SAO type in an encoded video bitstream, the method further comprising reconstructing the second set of samples based on the encoded video bitstream, and SAO filtering the second set of samples using the offset values.

11. A video coding device, the video coding device comprising:
a memory configured to store video data; and
one or more processors configured to:
determine that a sample adaptive offset (SAO) type for a first set of samples comprises a band classification offset type, wherein the video data includes sample values ranging from 0 to a maximum value;
determine a first center value for the first set of samples in response to determining that the SAO type for the first set of samples comprises the band classification offset type, wherein the first center value comprises a first value between 0 and the maximum value;
determine a second center value for a second set of samples of the video data in response to determining that an SAO type for the second set of samples comprises the band classification offset type, wherein the second center value comprises a second value between 0 and the maximum value, and wherein the first center value is different than the second center value;
based on the second center value, determine a first group of bands and a second group of bands, wherein the second center value identifies a band included in the first group of bands, and wherein the second group of bands comprises bands not included in the first group of bands, wherein each band of the first and second groups of bands comprises a range of sample values, and wherein each of the first and second groups of bands comprises one or more bands;
determine first offset values for the first group of bands;
determine second offset values for the second group of bands;
based on a sample value of at least one sample of the second set of samples, determine a band from the first or second group of bands; and
apply, to the at least one sample, an offset value associated with the determined band to generate a filtered image.

12. The video coding device of claim 11, wherein the one or more processors comprise a video decoder, and wherein the one or more processors are configured to determine the second center value by receiving a syntax element indicating the second center value.

13. The video coding device of claim 11, wherein the one or more processors comprise a video encoder, and wherein the one or more processors are further configured to generate a syntax element for inclusion in an encoded bitstream, wherein the syntax element indicates the second center value.

14. The video coding device of claim 11, wherein the one or more processors are configured to determine the second center value based on a mean value for the second set of samples.

15. The video coding device of claim 11, wherein the one or more processors are configured to determine the second center value based on a median value for the second set of samples.

16. The video coding device of claim 11, wherein the one or more processors are configured to determine the second center value based on a sample where a peak of a histogram lies.

17. The video coding device of claim 11, wherein the second set of samples comprises a largest coding unit.

18. The video coding device of claim 11, wherein the one or more processors are configured to determine the first offset values for the first group of bands by generating a band offset value for a first band of the first group based on a band offset for a second band of the first group.

19. The video coding device of claim 11, wherein the one or more processors are configured to determine the first offset values for the first group of bands by generating a band offset value for a band of the first group of bands based on a band offset determined for a neighboring partition.

20. The video coding device of claim 11, wherein the video coding device comprises at least one of:
an integrated circuit;
a microprocessor; or
a wireless communication device comprising one or both of a camera configured to generate the video data or a display configured to display the video data.

21. The video coding device of claim 11, wherein the video coder comprises a video decoder, and wherein the video coder is further configured to receive signaling information in an encoded video bitstream indicating the SAO type to determine that the SAO type for the second set of samples comprises the band classification offset type, and reconstruct the second set of samples based on the encoded video bitstream, and to SAO filter the second set of samples using the offset values.

22. A non-transitory computer-readable storage medium storing instructions operable to cause one or more processors to:
determine that a sample adaptive offset (SAO) type for a first set of samples of video data comprises a band classification offset type, wherein the video data includes sample values ranging from 0 to a maximum value;
in response to determining that the SAO type for the first set of samples comprises the band classification offset type, determine a first center value for the first set of samples, wherein the first center value comprises a first value between 0 and the maximum value;
determine that an SAO type for a second set of samples comprises the band classification offset type;
determine a second center value for a second set of samples in response to determining that the SAO type for the second set of samples comprises a band classification offset type, wherein the second center value comprises a second value between 0 and the maximum value, and wherein the first center value is different than the second center value;
based on the second center value, determine a first group of bands and a second group of bands, wherein the second center value identifies a band included in the first group of bands, and wherein the second group of bands comprises bands not included in the first group of bands, wherein each band of the first and second groups of bands comprises a range of sample values, and wherein each of the first and second groups of bands comprises one or more bands;
determine first offset values for the first group of bands;
determine second offset values for the second group of bands;
based on a sample value of at least one sample of the second set of samples, determine a band from the first or second group of bands; and
apply, to the at least one sample, an offset value associated with the determined band to generate a filtered image.

23. The non-transitory computer-readable storage medium of claim 22, wherein the one or more processors comprise a video decoder, and wherein the instructions cause the one or more processors to
determine the second center value by receiving a syntax element indicating the second center value.

24. The non-transitory computer-readable storage medium of claim 22, wherein the one or more processors comprise a video decoder, and wherein the computer-readable storage medium stores further instructions that cause the one or more processors to generate a syntax element for inclusion in an encoded bitstream, wherein the syntax element indicates the second center value.

25. The non-transitory computer-readable storage medium of claim 22, wherein the instructions cause the one or more processors to determine the second center value by determining a mean value for the second set of samples.

26. The non-transitory computer-readable storage medium of claim 22, wherein the instructions cause the one or more processors to determine the second center value by determining a median value for the second set of samples.

27. The non-transitory computer-readable storage medium of claim 22, wherein the second set of samples comprises a largest coding unit.

28. The non-transitory computer-readable storage medium of claim 22, wherein the instructions cause the one or more processors to determine the first offset values for the first group of bands by generating a band offset value for a first band of the first group based on a band offset for a second band of the first group.

29. The non-transitory computer-readable storage medium of claim 22, wherein the instructions cause the one or more processors to determine the first offset values for the first group of bands by generating a band offset value for a band of the first group of bands based on a band offset determined for a neighboring partition.

30. An apparatus for coding video data, the apparatus comprising:
means for determining that a sample adaptive offset (SAO) type for a first set of samples comprises a band classification offset type, wherein the video data includes sample values ranging from 0 to a maximum value;
means for determining a first center value for the first set of samples in response to determining that the SAO type for the first set of samples comprises the band classification offset type, wherein the first center value comprises a first value between 0 and the maximum value;
means for determining that a SAO type for a second set of samples comprises the band classification offset type;
means for determining a second center value for the second set of samples in response to determining that the SAO type for the second set of samples comprises the band classification offset type, wherein the second center value is based on sample values of the second set of samples, wherein the second center value comprises a second value between 0 and the maximum value, and wherein the first center value is different than the second center value;
means for determining, based on the second center value, a first group of bands and a second group of bands, wherein the second center value identifies a band included in the first group of bands, and wherein the second group of bands comprises bands not included in the first group of bands, wherein each band of the first and second groups of bands comprises a range of sample values, and wherein each of the first and second groups of bands comprises one or more bands;
means for determining first offset values for the first group of bands;
means for determining second offset values for the second group of bands;
means for determining a band from the first or second group of bands based on a sample value of at least one sample of the second set of samples; and
means for applying, to the at least one sample, an offset value associated with the determined band to generate a filtered image.

31. The apparatus of claim 30, wherein the apparatus comprises a video decoder, and wherein the means for determining the second center value comprises means for receiving a syntax element indicating the second center value.

32. The apparatus of claim 30, wherein the apparatus comprises a video encoder, and wherein the apparatus further comprises:
means for generating a syntax element for inclusion in an encoded bitstream, wherein the syntax element indicates the second center value.

33. The apparatus of claim 30, wherein the means for determining the second center value comprises means for determining a mean value for the second set of samples.

34. The apparatus of claim 30, wherein the means for determining the second center value comprises means for determining a median value for the second set of samples.

35. The apparatus of claim 30, wherein the second set of samples comprises a largest coding unit.

36. The apparatus of claim 30, wherein the means for determining the first offset values for the first group of bands comprises means for generating a band offset value for a first band of the first group based on a band offset for a second band of the first group.

37. The apparatus of claim 30, wherein the means for determining the first offset values for the first group of bands comprises means for generating a band offset value for a band of the first group of bands based on a band offset determined for a neighboring partition.

* * * * *